Jan. 22, 1952   J. V. URBANO   2,583,161
BRAKE SHOE LINING STRIPPER
Filed Sept. 8, 1949   2 SHEETS—SHEET 1
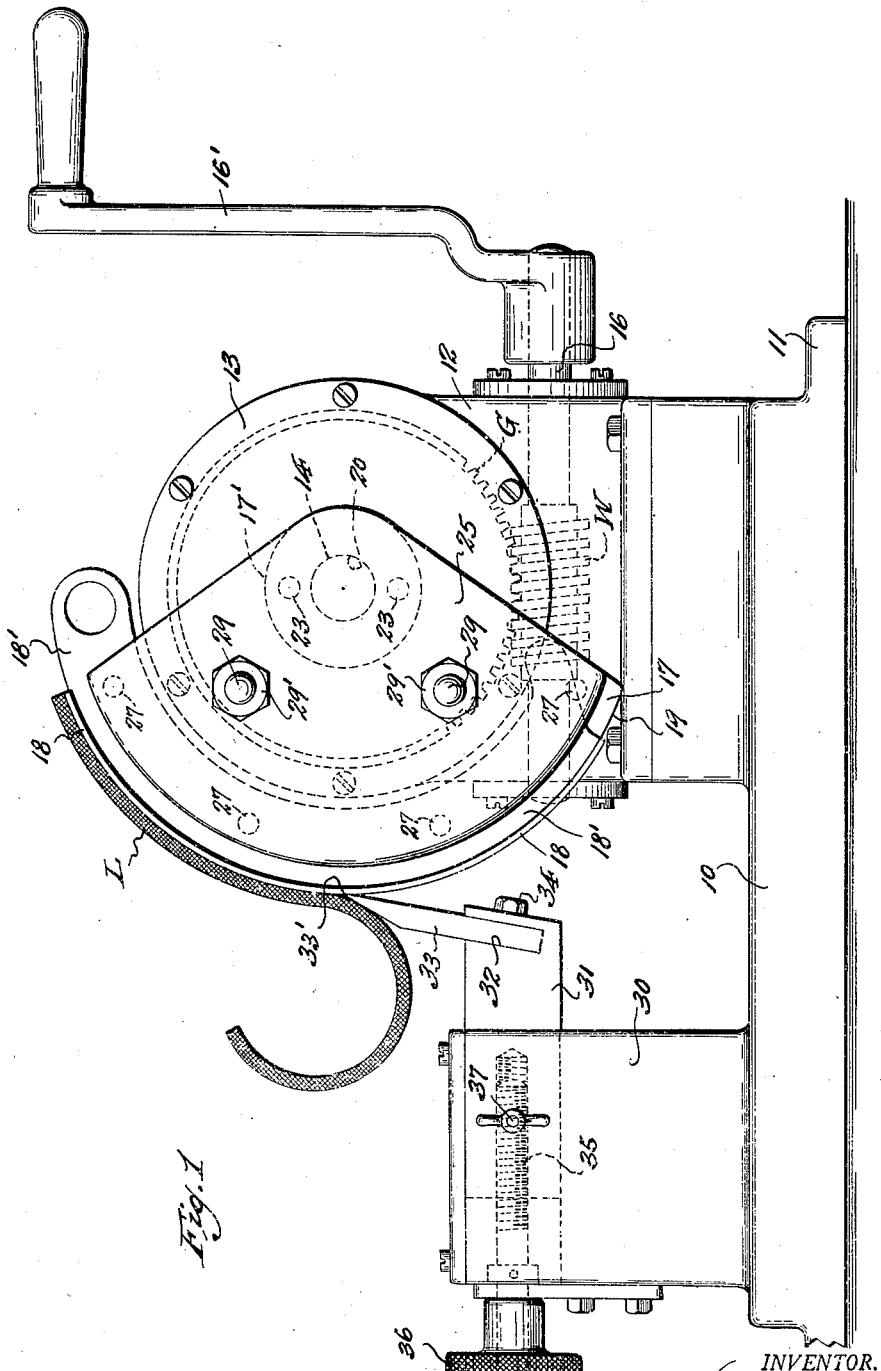
INVENTOR.
Joseph V. Urbano,
BY George D. Richards,
Attorney Jan. 22, 1952
J. V. URBANO
2,583,161
BRAKE SHOE LINING STRIPPER
Filed Sept. 8, 1949
2 SHEETS—SHEET 2
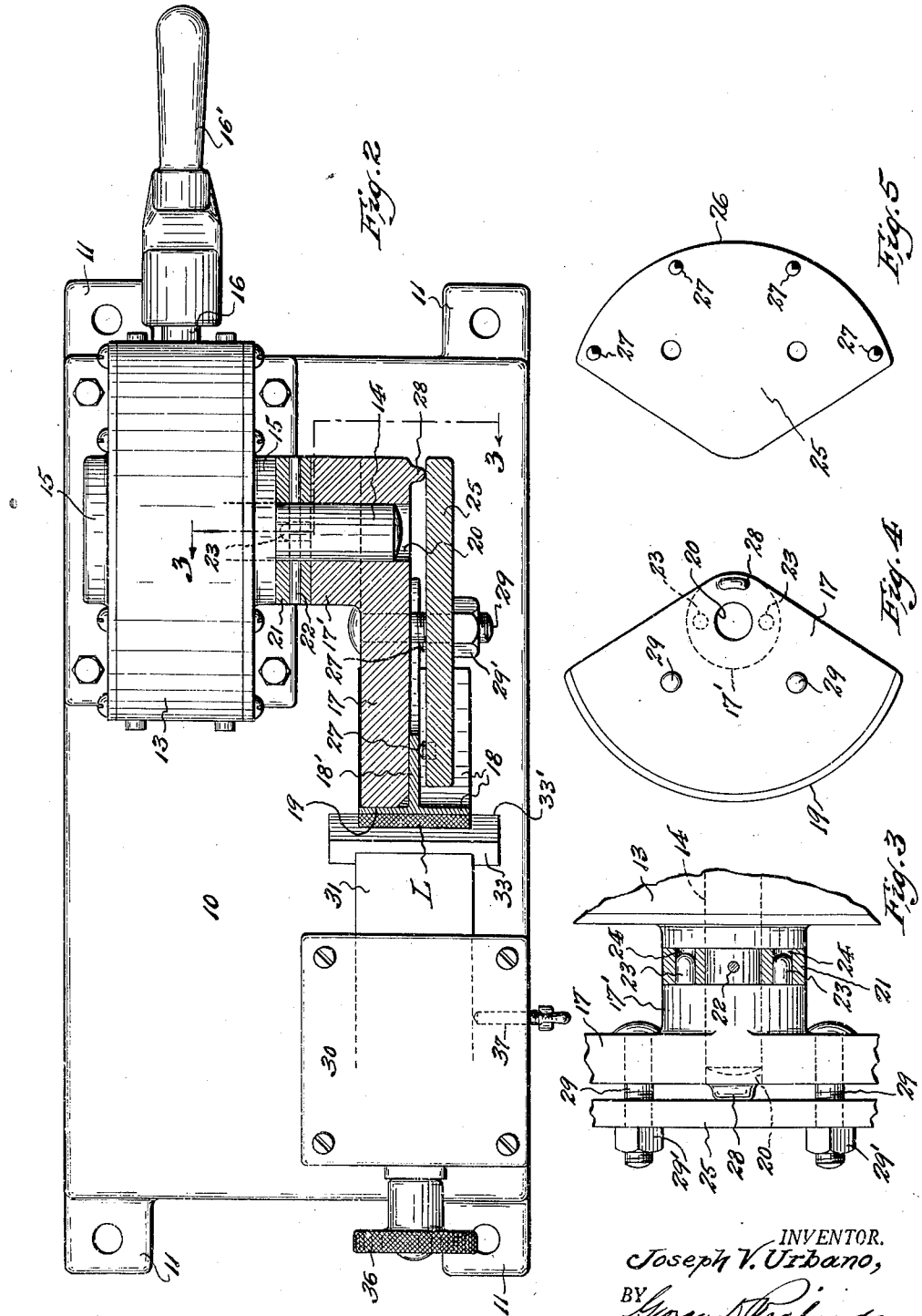
INVENTOR.
Joseph V. Urbano,
BY George D. Richards
Attorney Patented Jan. 22, 1952

2,583,161

UNITED STATES PATENT OFFICE 2,583,161

BRAKE SHOE LINING STRIPPER

Joseph V. Urbano, Newark, N. J.

Application September 8, 1949, Serial No. 114,598

2 Claims. (Cl. 164—38)

The invention relates to a special apparatus for stripping unserviceable linings from automobile brake shoes.

The current practice of adhesively bonding the lining to the circumferential faces of brake shoes, as an improvement upon the prior riveting method, has made removal of worn linings a laborious and time-consuming task generally involving the use of hammer and cold chisel.

It is, therefore, the primary object of the present invention to provide apparatus having means to revolve a brake shoe, including means to securely grip the shoe and rigidly hold the same against distortion and yielding shift, while a stripping tool is positioned to engage and accurately follow the line of cleavage between the shoe and its lining, so as to strip off the lining from the shoe, as the latter is revolved, by a single cutting movement; removal of the lining from the shoe by operation of the novel apparatus of this invention requiring only a fraction of the time and labor effort which is necessary in the practice of the old hand chipping method.

Another object is to provide an apparatus of the character above stated, which includes simple and interchangeable means for adapting the apparatus for operation upon brake shoes of different sizes.

An illustrative embodiment of the invention is shown in the accompanying drawings, in which:

Fig. 1 is a front elevation of a brake shoe lining stripper apparatus, according to the invention;

Fig. 2 is a top plan view of the same, with parts shown in section;

Fig. 3 is a fragmentary sectional view, with parts shown in elevation, taken on line 3—3 in Fig. 2; and Figs. 4 and 5 are respectively elevational views of the shoe carrier and cooperative clamp plate, showing the respective faces thereof which are opposed one to the other in use for operative gripping and holding of a brake shoe from which the lining is desired to be removed.

In an apparatus for stripping unserviceable linings from brake shoes, there is a controlling factor which must be borne in mind. A brake shoe is a precision product. Regardless of size, or radius of curvature, its circumferential face to which the friction lining is bonded will have the form of a perfect cylinder throughout its length. This is essential to smooth braking contact between the shoe lining and a coacting brake drum. Consequently, the stripping apparatus must incorporate means whereby the original form of each shoe operated upon will be preserved against distortion or mutilation of its circumferential face. As will become more clearly apparent presently, it is important that the cooperative shoe seating and clamping means of the stripping apparatus will fulfill this requirement; and has been designed with that end in view; other structural details and operative movements of the apparatus are subservient to that fundamental feature.

Referring now to the drawings, wherein like characters of reference indicate corresponding parts in the several views, the character 10 designates the preferably elongated base or bed of the apparatus. The apparatus is small and light enough to be portable but may, when desired, be bolted to a work bench or other support by use of the apertured lugs 11 with which the base is provided.

Rising from one end of bed 10 is an immovable pedestal 12 which supports gear box 13. A horizontal driven shaft or spindle 14 is journaled in suitable bearings 15 in gear box 13, and has one end projecting forwardly therefrom. In order that shaft 14 may be driven by hand slowly but with great application of power, a drive shaft 16, having an exteriorly disposed crank handle 16' attached thereto, is journaled in gear box 13, and is connected with driven shaft 14 by suitable low-gear transmission means, such as a worm W and cooperating worm gear G which are located inside gear box 13. To insure sufficient power, the gear ratio should be in the order of 1 to 100.

It is preferred to rotate a brake shoe to be operated upon relative to a stationary stripping tool, which will be described later herein. To this end, a shoe carrier 17 of special construction is provided, and is adapted to be attached to the driven shaft 14 for rotation therewith. Actually, it is desirable to provide a plurality of interchangeable shoe carriers of different sizes to respectively accommodate brake shoes of the several standard sizes, i. e., according to radii of their circumferential lined braking faces. The several shoe carriers constitute a matched set that is kept available for selective use of a particular shoe carrier that is appropriate for a particular brake shoe.

Since each brake shoe, of the well-known type illustrated in the drawings, comprises an arcuate body portion 18 of uniform thickness and an internal medial reinforcing rib 18' which is substantially coextensive and integral with said body portion, advantage has been taken of these structural details of the brake shoe, in designing each carrier to conform to and fit a shoe of given size. Each brake shoe, in any size thereof, extends approximately only one-third of the circumference of a circle, so considerable weight has been saved by making each carrier 17 in flat segmental form as shown particularly in Figs. 1 and 4. The periphery of carrier 17 is shaped to form a supporting seat 19 which conforms to and snugly fits against the inner face of the body portion 18 of a brake shoe of a given standard size. Shoe carrier 17 is provided concentric to arcuate seat 19 with a hub formation 17' having an axial attaching socket 20 adapted to fit over the protruding end of driven shaft 14.

To detachably connect a given shoe carrier 17 to the driven shaft 14, whereby the former can be operatively rotated by the latter when the apparatus is in use, a coupling means is provided. In one illustrative form of such coupling means, as shown, the same comprises a collar 21 which is fixed on driven shaft 14 so as to rotate therewith, as e. g. by a cross-pin 22. Affixed to and so as to project from the hub 17' of the shoe carrier, parallel to the axis of rotation, are one or more coupling pins or dowels 23. When the shoe carrier 17 is engaged over the shaft 14, and thrust home thereon, said pins or dowels 23 are caused to enter and seat within corresponding socket or sockets 24 with which the driven collar 21 is provided, thus transmitting through the latter the rotary motion of the shaft 14 to the shoe carrier 17.

When a brake shoe 18 is mounted on the seat 19 of a shoe carrier 17 of appropriate size with its rib 18' bearing against the outer side face of said carrier, as shown particularly in Fig. 2, rib 18' affords convenient means by which the shoe is attached to the carrier in operational position. To bind the brake shoe to the carrier 17, a segmental clamp plate 25 is provided for cooperation with carrier 17 in such manner as to grip both side faces of rib 18'. The peripheral edge of clamp 25 is conformable to the interior face of brake shoe body 18, but not necessarily to contact therewith. Adjacent to its peripheral edge 26, clamp plate 25 is provided with an arcuate row of inwardly projecting gripping studs 27 that preferably have sharp pointed free ends adapted to engage the rib 18' of brake shoe 18. For convenience of replacement, it is desirable to thread each stud 27 into clamp plate 25. Two of these gripping studs 27, when suitably spaced apart, are sufficient to afford uniform and unyielding gripping engagement of clamp plate 25 with the shoe rib 18'. Inwardly of studs 27 and preferably adjacent to attaching socket 20, shoe carrier 17 is provided, on its brake shoe engaging face, with a projecting fulcrum lug 28 that is adapted to bear against the inner face of clamp plate 25. It would be within the scope of the invention, of course, to reverse the arrangement and form lug 28 on clamp plate 25 instead of on shoe carrier 17. To complete the clamp structure, at least one, and preferably two, clamping screws 29 are fixed in the carrier 17 to project outwardly therefrom through the clamp plate 25 intermediate of fulcrum lug 28 of the carrier 17 and gripping studs 27 of the clamp plate. By use of screws 29 and cooperating nuts 29', clamp plate 25 may be rocked on lug 28 as a fulcrum to press studs 27 tightly against shoe rib 18', and thereby strongly grip the shoe as a whole to securely hold the same in supported position, and against distortion and yielding shift.

At the end of bed 10, opposite to pedestal 12, a tool head 30 is stationarily disposed. A slide 31, which is horizontally movable in head 30 toward and away from a shoe carrier operatively mounted on the shaft 14, has an inclined socket 32 at its outer free end for reception of a suitable stripping blade 33. A clamping bolt 34 is provided in the outer end portion of slide 31 for the purpose of clamping tool 33 rigidly in socket 32. At the outer end of tool head 30, an adjusting screw 35 is rotatably mounted for screw-threaded engagement with slide 31. An exteriorly disposed manipulating knob 36 is fixed on outer end of adjusting screw 35 for manipulation of the latter to feed the tool slide in and out as may be required to dispose the cutting edge of the stripping blade 33 at the line of cleavage between the brake shoe 18 and its lining L desired to be operated upon for stripping the latter from the former. A set screw 37 has been provided in tool head 30 for locking engagement with tool slide 31 in order that the latter may be secured in adjusted position for operative disposition of the blade 33.

Stripping tool 33 should be of such length that its sharpened cutting edge 33' will be located substantially in a plane which intersects the axis of driven shaft 14. The cutting edge should be straight and of a width at least equal to and preferably substantially greater than the width of body 18 of the largest brake shoe that may be operated upon by the apparatus.

The operation of the apparatus will now be described. When the lining L is to be removed from a particular brake shoe 18, a shoe carrier 17 of appropriate size is selected from the matched set thereof and is applied to driven shaft 14 in such a manner that coupling pins 23 of the shoe carrier will enter sockets 24 of collar 21, and thus affix the shoe carrier on the shaft 14 so as to be rotated thereby. Then, the brake shoe is fitted against the seat 19 of shoe carrier 17, and clamp plate 25 is assembled with said shoe carrier. While the shoe is held in firm, contacting engagement with said seat 19, the nuts 29' are turned home on the clamping screws 29 until the brake shoe rib 18' has become tightly gripped between studs 27 of the clamp plate 25 and the opposed face of shoe carrier. In this clamped position, the brake shoe will be rigidly supported throughout its length, and firmly held against any forces which would tend either to distort it from its normal form, or to cause yielding shift thereof.

By means of crank handle 16' shaft 14 can be rotated, so that the revolved shoe carrier will bring the leading end of brake shoe 18 into starting position immediately above the level of the cutting edge 33' of stripping blade 33. Thereafter, manipulation of the knob 36 operates the adjusting screw 35 to move tool slide 31 inward toward shoe carrier 17 until the cutting edge 33' of blade 33 is precisely tangential to the circumferential face of the body of the brake shoe 18. When this blade setting has been accomplished, set screw 37 should be tightened to insure that the slide 31 cannot creep or back off under pressure, which is most likely to occur if the threads of adjusting screw 35 become worn with use.

Now, crank handle 16' may be operated to rotate shaft 14 and shoe carrier 17 slowly and with great power in counter-clockwise direction (Fig. 1) until the lining L has been completely stripped away from the brake shoe body. At the outset of this operation, great care should be taken to insure that the cutting edge 33' of blade 33 is following the line of cleavage without objectionable scraping of the periphery of said brake shoe body. When accurately set, the blade will cut into nothing but the adhesive substance that bonds the lining L to the brake shoe body face, since the brake shoe has been fitted properly firmly upon the seat of the shoe carrier 17.

The provision of shoe carriers of different sizes not only serves to accommodate the apparatus to the various standard sizes of brake shoes but also reduces the degree of precise adjustment of the tool slide required at the time of making a change from one size brake shoe to another. The substitution of one carrier for another effects rough adjustment of the work with reference to the blade, whereupon only minor precision adjustment of the tool slide is necessary to place the blade's cutting edge in proper relation to the line of cleavage of the lining of a brake shoe desired to be operated upon.

Having now described my invention, I claim:

1. In apparatus for stripping the bonded linings from brake shoes by means of a stripping tool blade supported to present its cutting edge tangent to the face of a brake shoe body as operated upon by the apparatus, a rotatably mounted driven shaft, a brake shoe carrier having an arcuate external seating face adapted to fit the internal face of a brake shoe body and an axial attaching socket concentric to the seating face adapted to receive the driven shaft, means for connecting the carrier to the driven shaft for rotation therewith, and clamping means associated with the carrier for securing a brake shoe fixedly in operational position on the seating face thereof, said clamping means comprising a clamping plate opposed to the outer side of the carrier for reception of the medial rib of a brake shoe body therebetween, an arcuate row of spaced gripping studs projecting from the inner side of the clamping plate whereby to engage and grip the brake shoe rib, a fulcrum lug projecting from the carrier to pivotally support said clamping plate, and clamp bolt means extending from said carrier through the clamping plate and located intermediate the row of gripping studs and said fulcrum lug, said clamp bolt means being operative to draw the clamping plate and its gripping studs toward the carrier whereby to grip the brake shoe rib therebetween.

2. In apparatus for stripping the bonded linings from brake shoes by means of a stripping tool blade supported to present its cutting edge tangent to the face of a brake shoe body as operated upon by the apparatus, a shaft, means for driving said shaft, a brake shoe carrier fixed on the said shaft, said carrier having an arcuate peripheral seat concentric to the shaft upon which the inner face of a brake shoe body can be seated for the support of said body, and means to clamp the brake shoe body to the carrier comprising a clamping plate opposed to the outer side of the carrier for reception of the medial rib of the brake shoe body therebetween, an arcuate row of spaced gripping studs projecting from the inner side of the clamping plate whereby to engage and grip the brake shoe rib, a fulcrum lug projecting from the carrier to pivotally support said clamping plate, and clamp bolt means extending from said carrier through the clamping plate and located intermediate the row of gripping studs and said fulcrum lug, said clamp bolt means being operative to draw the clamping plate and its gripping studs toward the carrier whereby to grip the brake shoe or rib therebetween.

JOSEPH V. URBANO.

REFERENCES CITED

The following references are of record in the file of this patent:

UNITED STATES PATENTS

| Number | Name | Date |
| --- | --- | --- |
| 30,736 | Keen | Nov. 27, 1860 |
| 100,771 | Kavanagh | Mar. 15, 1870 |
| 1,653,104 | Kimmerling | Dec. 20, 1927 |